United States Patent
Braun et al.

(10) Patent No.: US 8,188,852 B2
(45) Date of Patent: May 29, 2012

(54) MACHINE-TOOL SAFETY DEVICE

(75) Inventors: Heiko Braun, Leinfelden-Echterdingen (DE); Wolfgang Baierl, Remshalden (DE); Michael Mahler, Leinfelden-Echterdingen (DE); Alexander Werner Hees, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 195 days.

(21) Appl. No.: 12/606,658

(22) Filed: Oct. 27, 2009

(65) Prior Publication Data

US 2010/0102952 A1 Apr. 29, 2010

(30) Foreign Application Priority Data

Oct. 28, 2008 (DE) .......................... 10 2008 043 215

(51) Int. Cl.
*G08B 1/00* (2006.01)

(52) U.S. Cl. ........ 340/532; 340/506; 340/504; 340/505; 340/679; 340/3.1

(58) Field of Classification Search ................. 340/532, 340/506, 3.1, 505, 504, 538.15, 679, 3.43, 340/3.44
See application file for complete search history.

(56) References Cited

U.S. PATENT DOCUMENTS

| 5,400,246 A * | 3/1995 | Wilson et al. .................... 700/17 |
| 2003/0045319 A1* | 3/2003 | Sarkar et al. .................... 455/522 |
| 2005/0129058 A1* | 6/2005 | Casaccia et al. ............... 370/464 |
| 2009/0131095 A1* | 5/2009 | Rofougaran .................. 455/522 |

* cited by examiner

*Primary Examiner* — Daryl Pope
(74) *Attorney, Agent, or Firm* — Kenyon & Kenyon LLP

(57) ABSTRACT

A machine-tool safety device for a machine tool having a transmitting unit for transmitting an outgoing signal and a receiving unit for receiving an incoming signal. The machine-tool safety device has an adjusting unit for at least semi-automatically adjusting the outgoing signal to be transmitted.

11 Claims, 3 Drawing Sheets

MACHINE-TOOL SAFETY DEVICE

RELATED APPLICATION INFORMATION

The present application claims priority to and the benefit of German patent application no. 102008043215.6, which was filed in Germany on Oct. 28, 2008, the disclosure of which is incorporated herein by reference.

FIELD OF THE INVENTION

The present invention relates to a machine-tool safety device.

BACKGROUND INFORMATION

A machine-tool safety device for a machine tool is already known that has a transmitting unit for transmitting an outgoing signal and a receiving unit for receiving an incoming signal.

SUMMARY OF THE INVENTION

A machine-tool safety device for a machine tool is already known that has a transmitting unit for transmitting an outgoing signal and a receiving unit for receiving an incoming signal.

It is provided that the machine-tool safety device have an adjusting unit for at least semi-automatically adjusting the outgoing signal to be transmitted. In this context, "provided" is to be understood as specially designed and/or specially equipped and/or specially programmed. In addition, an "outgoing signal" is to be understood, in particular, as a signal that may be constituted of a wide-band signal and particularly advantageously of an ultra-wideband signal. An "ultra-wideband signal" (or UWB signal) is understood, in particular, to be an electromagnetic signal which has a useful frequency range having a medium frequency in the frequency region from 1 GHz to 15 GHz and a frequency bandwidth of at least 500 MHz. It is particularly advantageous that the ultra-wideband signal have a maximum spectral power density of −41.3 dBm/MHz. However, it is fundamentally conceivable that the outgoing signal be constituted of other signals that are deemed useful by one skilled in the art.

A protection zone assigned to a tool of the machine tool may be monitored by the transmitting unit and the receiving unit, thereby allowing any potential contact of an operator with the tool to be recognized in sufficient time by the transmitting unit and the receiving unit. In addition, an "adjusting unit" is to be understood, in particular, as a unit that is composed of a processing unit and/or an evaluation unit and/or a feedback control unit and/or of a control unit, the feedback control unit being able to be composed both of a processor alone, as well as, in particular, of a processor and other electronic components, such as a memory arrangement. In addition, "adjust" is to be understood, in particular, as a control and/or as a feedback control. The embodiment according to the present invention allows the outgoing signal, respectively a parameter of the outgoing signal, to be advantageously adapted to an ambient environment.

The machine-tool safety device is suited for all types of machine tools where it is deemed appropriate to monitor a protection zone around a tool. The machine-tool safety device may be used very advantageously for saw machine tools and, in particular, for circular saws since particularly dangerous situations necessitate a high level of safety and a reduction in a risk of injury to an operator when operating the circular saws.

The adjusting unit is provided very advantageously in this case for adjusting a power of the outgoing signal to be transmitted. In this connection, the power may be advantageously adapted to an ambient environment. In addition, a power may be minimized in this manner, and thus a potential interference emission, respectively a potential interference by the transmitting unit, such as an interference of an air-traffic control, may be advantageously reduced and/or prevented. Moreover, due to a minimized power of the outgoing signal, the machine-tool safety device may be operated at least to some extent as an unrestricted device.

To this end, the adjusting unit may be at least partially composed of a feedback control unit which is provided for feedback-controlling the power of the outgoing signal to be transmitted. In this context, "feedback control unit" is to be understood, in particular, as a unit that may be composed of a processing unit and/or of an evaluation unit and/or of a control unit, the feedback control unit being able to include a processor alone, as well as, in particular, a processor and other electronic components, such as a memory arrangement, for example. This embodiment advantageously permits a constant, in particular automatic adaptation of the power of the outgoing signal to be transmitted.

It is especially advantageous that the feedback control unit be provided for feedback-controlling the power of the outgoing signal to be transmitted, as a function of at least one signal parameter of the received incoming signal, whereby an adaptation of the power of the outgoing signal to changes in a detection range of the machine-tool safety device may be achieved. In this context, a "signal parameter" is understood, in particular, to be a parameter of the input signal that is generated from a power, in particular of a spectral power density.

One approach also provides that the feedback control unit allow a material parameter to be ascertained on the basis of the signal parameter, thereby making it possible for the outgoing signal to be transmitted to be advantageously adapted and/or adjusted to a material property, in particular of a workpiece to be machined. It is particularly beneficial that the material parameter be composed of a parameter of a conductivity and/or a thickness and/or a dielectric parameter and/or of other material parameters that are deemed useful by one skilled in the art. In particular, the outgoing signal, respectively the power of the outgoing signal may be adapted to a thickness and/or to a moisture content of the workpiece. For example, a higher outgoing signal power may be adjusted for a thick workpiece to be machined than for a thin workpiece to be machined.

It is also provided that the feedback control unit compute the material parameter using a model calculation. A plurality of material parameters may be determined at the same time in one model, in particular, on the basis of a variation in the corresponding material parameters in the model for reproducing the measured signal parameter. In this connection, a "model calculation" is to be understood, in particular, as a calculation of parameters on the basis of a model, a "model" being understood, in particular, as a system, which, as a representative of an original, is utilized, selected and/or created for a specific task on the basis of important properties of a third system that is common thereto, in order to enable the latter to acquire, control and/or describe the original, or to facilitate or, respectively, replace the same.

Another embodiment of the present invention provides that the feedback control unit be provided for adapting the power of the outgoing signal to be transmitted to a dynamic range of the receiving unit. In this connection, a "dynamic range" is to be understood, in particular, as a sensitivity range of the receiving unit, that may extend from a lower noise limit to a saturation limit. An especially low-noise, clean incoming signal may be achieved in the receiving unit. In addition, a background influence may be advantageously minimized.

It is also provided that the machine-tool safety device have an evaluation unit for analyzing a subrange of the dynamic range of the receiving unit within which the incoming signal resides. A high resolution of the subrange may be achieved in this case and thus, accordingly, a detailed and precise analysis of the incoming signal, in particular, a change in an amplitude and/or in a phase of the incoming signal.

One advantageous further refinement of the exemplary embodiments and/or exemplary methods of the present invention provides for a method for a machine-tool safety device, an outgoing signal to be transmitted being at least semi-automatically adjusted. The outgoing signal, respectively a parameter of the outgoing signal, may be advantageously adapted to an ambient environment. It is especially beneficial in this connection that a power of the outgoing signal be at least semi-automatically adjusted.

In addition, it is provided that the power of the outgoing signal to be transmitted be at least semi-automatically feedback-controlled. The power of the outgoing signal may be advantageously adapted to an ambient environment. In addition, a power may be minimized in this manner, and thus a potential interference emission, respectively a potential interference by the transmitting unit, such as an interference of an air-traffic control, may be advantageously reduced and/or prevented. Moreover, a minimized power allows, at least to some extent, an unregistered operation of the machine-tool safety device.

In addition, it is provided that the power of the outgoing signal to be transmitted be feedback-controlled as a function of at least one workpiece parameter of a workpiece to be machined, thereby making it possible for the outgoing signal to be transmitted to be advantageously adapted and/or adjusted to a material property, in particular of a workpiece to be machined. It is particularly beneficial that the material parameter be composed of a conductivity and/or a thickness and/or a dielectric constant and/or of other material parameters that are deemed useful by one skilled in the art.

In addition, it is provided that the power of the outgoing signal to be transmitted be adapted to a dynamic range of a receiving unit, thereby making it possible to achieve an especially low-noise, clean incoming signal in the receiving unit. In addition, any background influence may be advantageously minimized.

Further advantages are derived from the following description of the drawing. An exemplary embodiment of the present invention is illustrated in the drawing. The drawing, the specification and the claims include numerous features in various combinations. One skilled in the art will advantageously consider the features individually as well, and conceive of other useful combinations.

DETAILED DESCRIPTION

Figure 1:
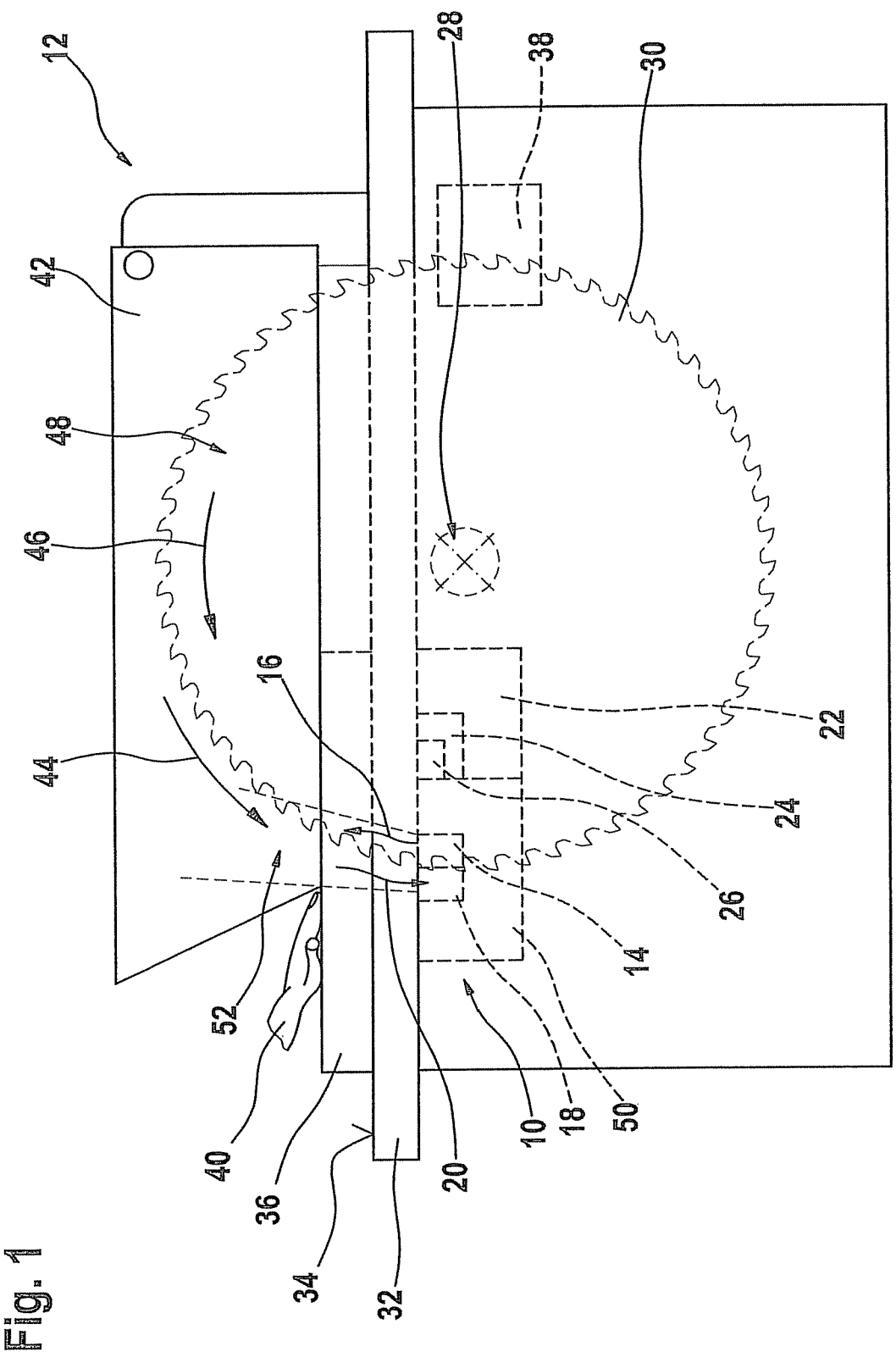
FIG. 1 shows a machine tool having a machine-tool safety device according to the present invention in a schematic representation.

FIG. 1 shows a machine tool 12 that is constituted of a circular saw bench. Machine tool 12 includes a tool holding fixture 28 in which a tool 30 constituted of a circular saw bench is located. In an assembled state, tool 30 projects through a recess (not shown more closely) of a workbench 32 of machine tool 12. Workbench 32 has a working surface 34, which is provided for placing a workpiece 36 that is machined during operation of machine tool 12. In addition, machine tool 12 includes a motor unit 38 which, in operation, generates a driving torque for tool 30. In addition, machine tool 12 has a machine-tool safety device 10 that is provided for protecting an operator 40 from tool 30 during operation of machine tool 12. Machine-tool safety device 10 has a protective hood 42 which is configured along a circumferential direction 44 of tool 30 that extends in parallel to a direction of rotation 46 of tool 30 about a partial region 48 of tool 30 that projects out of workbench 32.

Figure 2:
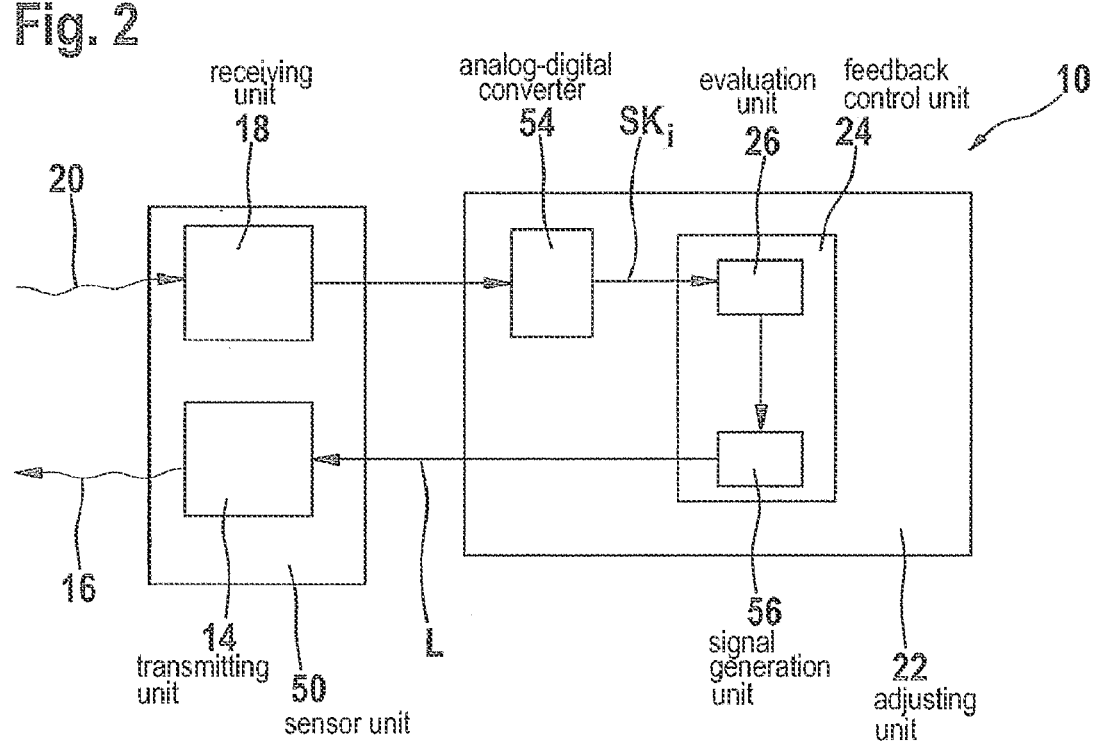
FIG. 2 shows a flow chart for the feedback-controlling of the power of the outgoing signal by the feedback control unit.

Machine-tool safety device 10 has a sensor unit 50 having a transmitting unit 14 for transmitting an outgoing signal 16 during operation of the circular saw bench, and a receiving unit 18 for receiving an incoming signal 20 (FIGS. 1 and 2). Transmitting unit 14 and receiving unit 18 are provided for monitoring a protection zone 52 facing tool 30. In this connection, transmitting unit 14 is provided for transmitting an ultra-wideband signal that is reflected off of objects located in protection zone 52, such as, in particular, workpiece 36 and the limbs of operator 40. The reflection signal is subsequently received by receiving unit 18 during operation. Sensor unit 50 is mounted underneath workbench 32 (FIG. 1). Transmitting unit 14 and receiving unit 18 may be at least partially designed in one piece, respectively one part. In principle, in another embodiment of the present invention, sensor unit 50 may be located in protective hood 42 and/or receiving unit 18 may be provided for receiving a transmission signal, in this case, transmitting unit 14 and receiving unit 18 being configurable as spatially separate units.

In addition, machine-tool safety device 10 has an adjusting unit 22 having a feedback control unit 24 which is provided for adjusting or feedback-controlling a power L of outgoing signal 16 to be transmitted of transmitting unit 14 during operation of machine tool 12. Power L of outgoing signal 16 to be transmitted is feedback-controlled as a function of at least one signal parameter $SK_i$ of received incoming signal 20. To this end, feedback control unit 24 has an evaluation unit 26 which analyzes incoming signal 20 of receiving unit 18, respectively signal parameter $SK_i$, which is composed, for example, of a power, respectively of a spectral power density. During operation of machine-tool safety device 10, the signals received by receiving unit 18 are directed via an analog-digital converter 54 of adjusting unit 22 to feedback control unit 24, respectively to evaluation unit 26 of feedback control unit 24. On the basis of signal parameter $SK_i$, a material parameter $MK_i$, respectively a plurality of material parameters $MK_i$ is/are ascertained in evaluation unit 26. Material parameters $MK_i$ may be composed of a parameter of a conductivity $MK_1$ and/or of a thickness $MK_2$ of a workpiece 36 to be machined and/or of a dielectric parameter $MK_3$ and/or of other material parameters $MK_i$ that are deemed useful by one skilled in the art. A model calculation is used to determine material parameters $MK_i$ in evaluation unit 26 in that a plurality of material parameters $MK_i$ are varied in the determination until a best possible conformance of the model calculation to the measured and received signal parameter $SK_i$ of incoming signal 20 is reached. In one alternative embodiment of the present invention, material parameters $MK_i$ may be additionally ascertained using other methods that are deemed useful by one skilled in the art.

Figure 3:
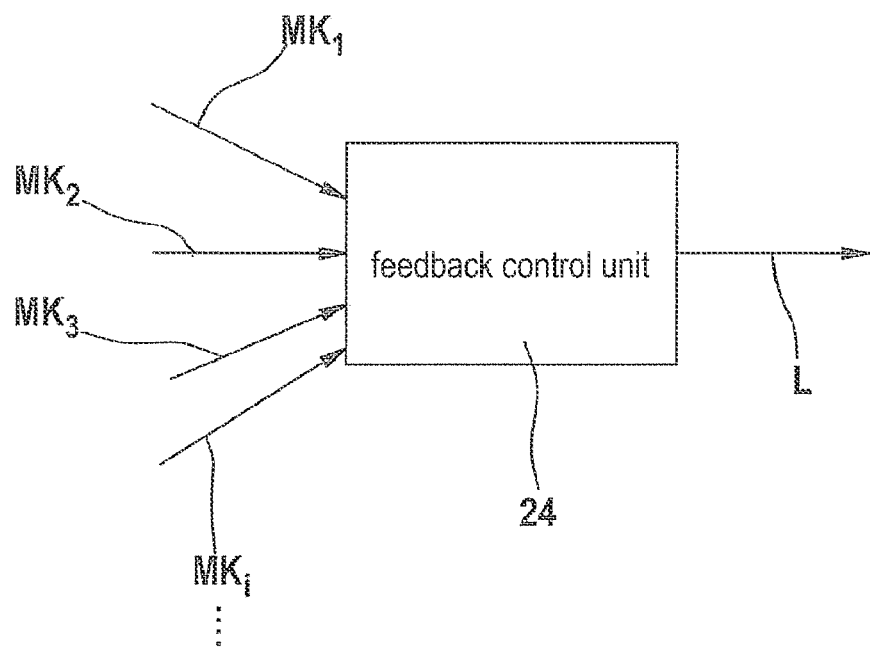
FIG. 3 shows a schematic representation of a feedback control of the transmitting power by the feedback control unit.

Power L of outgoing signal 16 to be transmitted is ascertained, respectively calculated by feedback control unit 24 on the basis of ascertained material parameters $MK_i$, so that power L of outgoing signal 16 to be transmitted is adapted to a thickness of workpiece 36 and/or to a conductivity of workpiece 36, and thus to a moisture content of workpiece 36 and/or to other parameters of workpiece 36 during operation of machine tool 12 (FIG. 3). Feedback control unit 24 subsequently generates outgoing signal 16 to be transmitted at ascertained power L that is adapted to material parameters $MK_i$ of workpiece 36; to this end, feedback control unit 24 having a signal generation unit 56, for directing signals to transmitting unit 14 and for transmitting them from the same (FIG. 2). A current material parameter $MK_i$ of workpiece 36 to be machined is always considered by feedback control unit 24 when calculating power L of outgoing signal 16 to be transmitted.

Figure 4:
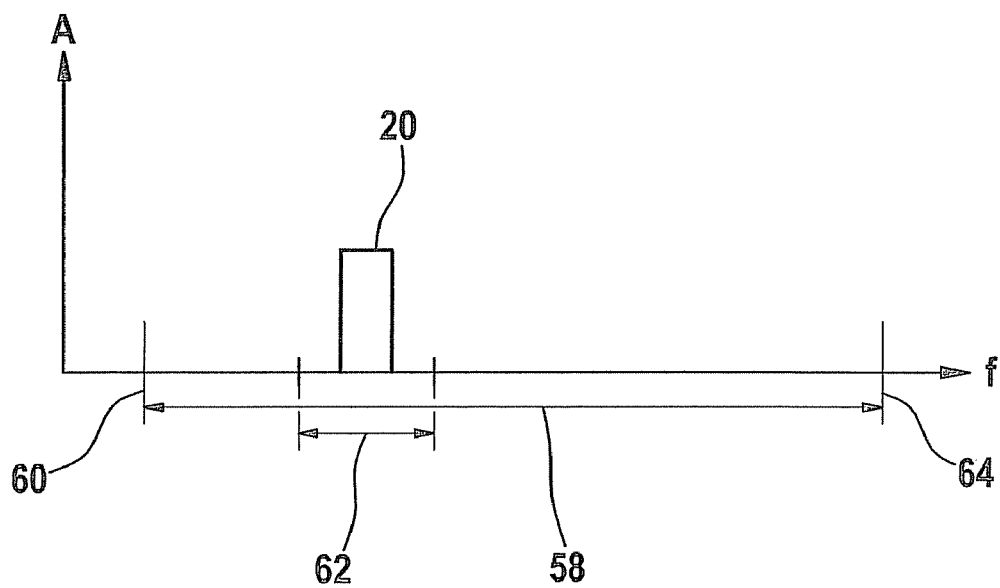
FIG. 4 shows a representation of a dynamic range of the receiving unit.
Figure 5:
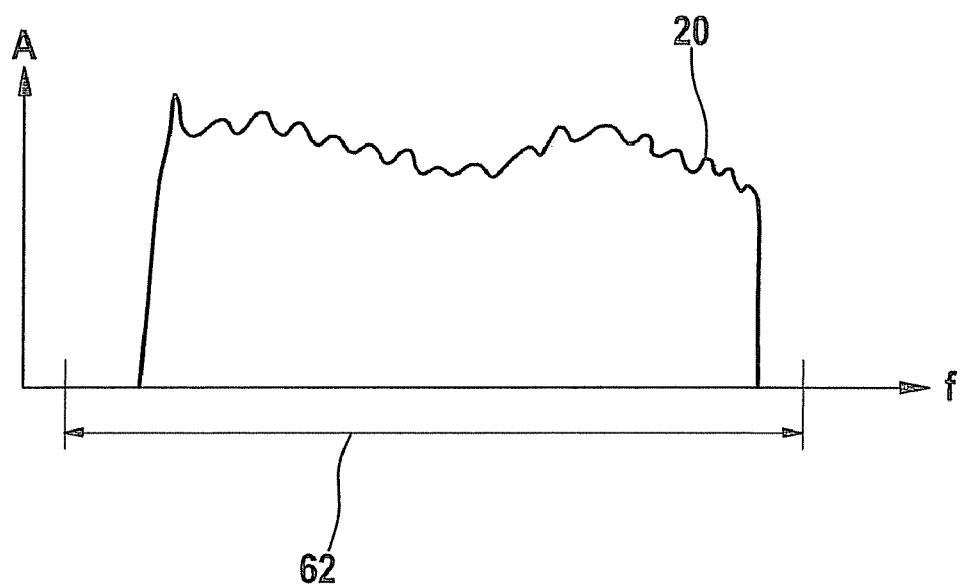
FIG. 5 shows a representation of a highly resolved subrange of the dynamic range.

A dynamic range 58 of receiving unit 18 is considered by feedback control unit 24 when calculating power L of outgoing signal 16 to be transmitted, so that the signal transmitted by transmitting unit 14 and received by receiving unit 18 resides above a noise limit 60 of receiving unit 18. Dynamic range 58 of receiving unit 18 extends from noise limit 60 to a saturation limit 64, as is illustrated in FIG. 4 where an amplitude A is plotted over a frequency f. In addition, during operation of machine tool 12 when evaluating incoming signal 20, a subrange 62 of dynamic range 58 of receiving unit 18 is represented at a high resolution by adjusting unit 22, respectively by analog-digital converter 54, incoming signal 20 residing in subrange 62 (FIG. 5). Together with evaluation unit 26, a detailed analysis of incoming signal 20 may be achieved here, and a change in amplitude A and/or in a phase of incoming signal 20 may be taken into account in greater detail when determining material parameters $MK_i$.

What is claimed is:

1. A machine-tool safety device for a machine tool, comprising:
    a transmitting unit to transmit an outgoing signal;
    a receiving unit to receive an incoming signal; and
    an adjusting unit to at least semi-automatically adjust the outgoing signal to be transmitted;
    wherein the adjusting unit is at least partially composed of a feedback control unit which is provided for feedback-controlling a power of the outgoing signal to be transmitted, as a function of at least one signal parameter of the received incoming signal;
    wherein the feedback control unit is provided for determining a material parameter using the signal parameter.

2. The machine-tool safety device of claim 1, wherein the material parameter is composed of at least one of a conductivity parameter, a thickness parameter, and a dielectric parameter.

3. The machine-tool safety device of claim 1, wherein the feedback control unit is provided for determining the material parameter using a model calculation.

4. The machine-tool safety device of claim 1, wherein the feedback control unit is provided for adapting the power of the outgoing signal to be transmitted to a dynamic range of the receiving unit.

5. The machine-tool safety device of claim 1, wherein the adjusting unit has an evaluation unit for analyzing a subrange of a dynamic range of the receiving unit within which the incoming signal resides.

6. A saw machine tool, comprising:
    a machine-tool safety device, including:
        a transmitting unit to transmit an outgoing signal;
        a receiving unit to receive an incoming signal; and
        an adjusting unit to at least semi-automatically adjust the outgoing signal to be transmitted;
        wherein the adjusting unit is at least partially composed of a feedback control unit which is provided for feedback-controlling a power of the outgoing signal to be transmitted, as a function of at least one signal parameter of the received incoming signal;
        wherein the feedback control unit is provided for determining a material parameter using the signal parameter.

7. A method for a machine-tool safety device, the method comprising:
    at least semi-automatically adjusting, using an adjusting unit, an outgoing signal to be transmitted;
    wherein the machine-tool safety device includes:
        a transmitting unit to transmit an outgoing signal;
        a receiving unit to receive an incoming signal; and
        the adjusting unit to at least semi-automatically adjust the outgoing signal to be transmitted;
        wherein the adjusting unit is at least partially composed of a feedback control unit which is provided for feedback-controlling a power of the outgoing signal to be transmitted, as a function of at least one signal parameter of the received incoming signal;
        wherein the feedback control unit is provided for determining a material parameter using the signal parameter.

8. The method of claim 7, wherein a power of the outgoing signal to be transmitted is at least semi-automatically adjusted.

9. The method of claim 8, wherein the power of the outgoing signal to be transmitted is at least semi-automatically feedback-controlled.

10. The method of claim 8, wherein the power of the outgoing signal to be transmitted is feedback-controlled as a function of at least one material parameter of a workpiece to be machined.

11. The method of claim 8, wherein the power of the outgoing signal to be transmitted is adapted to a dynamic range of a receiving unit.

* * * * *